United States Patent [19]
Cohnen et al.

[11] 4,065,401
[45] Dec. 27, 1977

[54] BLOWING AGENT MIXTURE

[75] Inventors: Wolfgang Cohnen, Leverkusen; Gerhard Apel, Krefeld, both of Germany

[73] Assignee: Bayer Aktiengesellschaft, Leverkusen, Germany

[21] Appl. No.: 606,913

[22] Filed: Aug. 22, 1975

[30] Foreign Application Priority Data
Aug. 29, 1974    Germany ............................ 2441418

[51] Int. Cl.² ............................ C09K 3/00; C08J 9/08
[52] U.S. Cl. ............................ 252/350; 260/2.5 AE; 260/2.5 N; 264/DIG. 5
[58] Field of Search ................ 252/350; 264/DIG. 5; 260/2.5 AE, 2.5 N

[56] References Cited
U.S. PATENT DOCUMENTS
3,743,605   7/1973   LaClair ............................ 252/350

FOREIGN PATENT DOCUMENTS
1,252,891   10/1967   Germany ............................ 252/350

Primary Examiner—Richard D. Lovering
Attorney, Agent, or Firm—Gene Harsh; Lawrence S. Pope; Frederick H. Colen

[57] ABSTRACT

The invention refers to a blowing agent composition consisting of 1,4 butan-diol-bis-(carbonic acid ester-benzoic acid anhydride) and silicon dioxide. Silicon dioxide reduces the decomposition temperature of the anhydride while at the same time increasing the yield of gas substantially.

3 Claims, 1 Drawing Figure

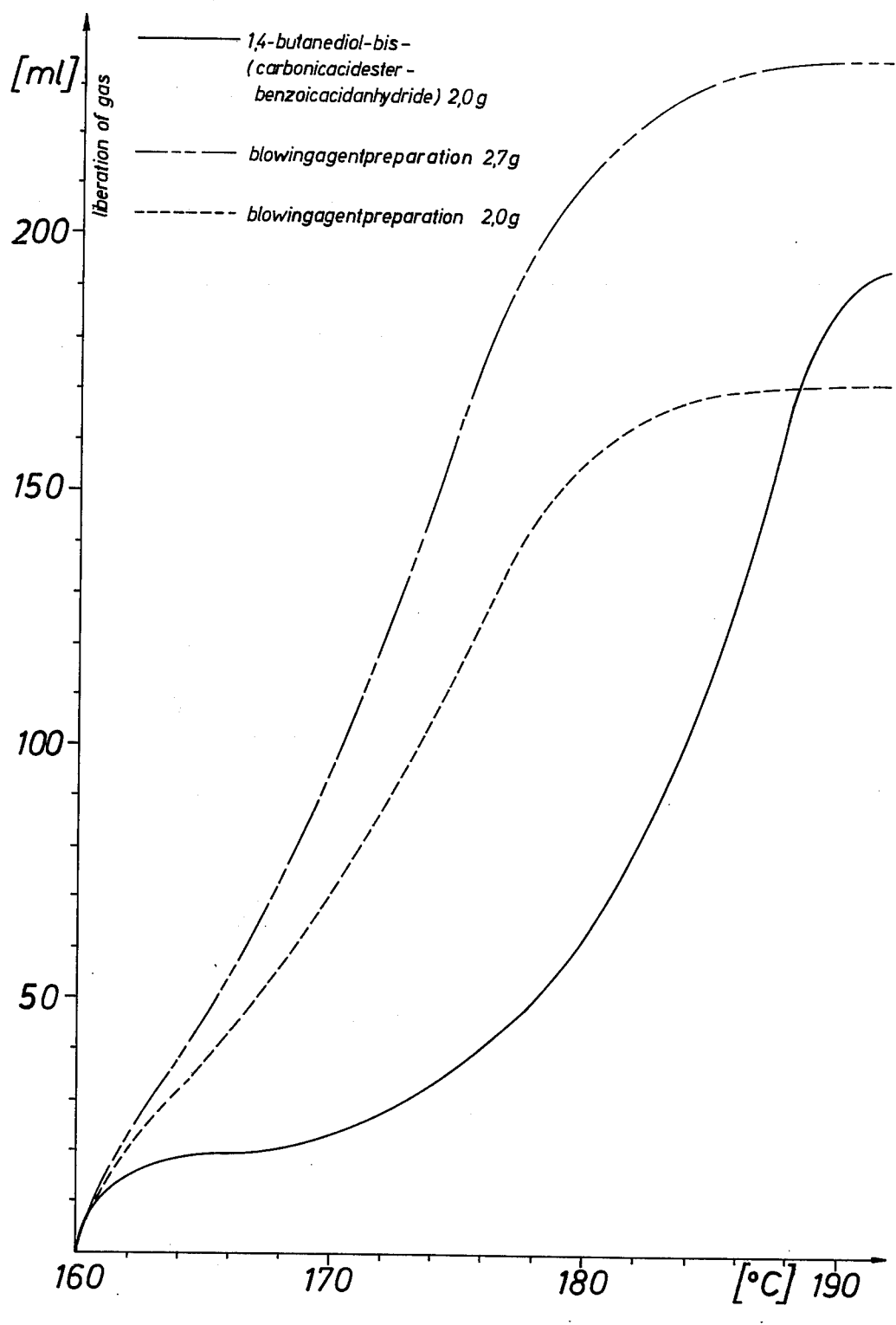

BLOWING AGENT MIXTURE

This invention relates to a blowing agent mixture based on 1,4-butane-diol-bis-(carbonic acid ester-benzoic acid anhydride) and to a process for the production of thermoplastic resin foams.

The expansion of thermmoplastic melts by decomposition of a blowing agent has become widely used for the production of moulded foam resins. 1,4-butanediol-bis-(carbonic acid ester-benzoic acid anhydride) has already been used as blowing agent for this purpose. The use of this product for the production of foams from thermoplasts has been described in German Pat. No. 1,252,891.

The low melting point of 1,4-butanediol-bis-(carbonic acid ester-benzoic acid anhydride), which is only 77° C, however, stands in the way of its wider use. When the dried thermoplast granulates are ready for processing and are mixed with the blowing agent while they are still hot, the blowing agent melts and causes the formation of lumps in the granulate which give rise to difficulties in mixing and dosing. Furthermore, the decomposition products of the blowing agent affect the average molecular weight of certain thermoplasts. The demand for compatibility of the molten thermoplast with the blowing agent and its decomposition products may be met more easily in polymers, such as polyolefines or polyvinyl chloride, which are resistant to saponifying agents than in polycondensates, such as polycarbonate based on bisphenol A. The decomposition products of 1,4-butanediol-bis-(carbonic acid ester-benzoic acid anhydride) have an adverse effect on the average molecular weight of polycarbonates based on bisphenol A. The reduction in average molecular weight increases with increasing decomposition temperature and with increasing concentration of the blowing agent.

It was an object of this invention to develop a blowing agent based on 1,4-butanediol-bis-(carbonic acid ester-benzoic acid anhydride) which would not have the disadvantages described above. It has now been found that the addition of finely divided silicon dioxide activates the decomposition of 1,4-butane-diol-bis-(carbonic acid ester-benzoic acid anhydride). The decomposition temperature is reduced by up to 30° C and the yield of blowing gas is increased by up to 20%. It could also be found that the reduction in average molecular weight of the polycarbonate based on bisphenol A is very limited. Thus, moulded polycarbonate foam products produced from polycarbonate with the aid of the blowing agent mixture according to the invention have a higher level of mechanical properties, such as impact strength, for example, than moulded polycarbonate foam products of the same density which have been foamed with 100% 1,4-butanediol-bis-(carbonic acid ester-benzoic acid anhydride). Moreover, the moulded products produced with the aid of the blowing agents according to the invention have an extremely fine pore structure.

This invention therefore relates to a blowing agent mixture consisting of 1,4-butanediol-bis-(carbonic acid ester-benzoic acid anhydride) and silicon dioxide. Another object of this invention is the application of this blowing agent mixture to the production of foamed moulded products of thermoplastic resin.

1,4-butanediol-bis-(carbonic acid ester-benzoic acid anhydride) may easily be obtained by the process according to German Pat. No. 1,133,727. The silicon dioxide used preferably has a surface area according to B.E.T. of from 50 to 400 m$^2$/g, more preferably from 300 to 350 m$^2$/g. The surface is measured by the known process of BRUNAUER, EMMET and TELLER. This process has been described in "The Journal of the American Chemical Society" 1938, Volume 60, page 309.

The silicon dioxide preferably has a water content of less then 1.5%, by weight. The water content may be determined by the weight loss after 2 hours' drying at 150° C. The proportion of pure silicon dioxide should preferably be greater than 99.8%. The weight loss after 2 hours' annealing at 1000° C should preferably be less than 2.5%.

The preparation of blowing agents may be obtained by mixing the components in the conventional manner, for example, by milling. It may contain any proportion of silicon dioxide, but preferably from 0.5 to 70%, by weight, and, in particular, from 15 to 40%, by weight. The proportion of 1,4-butanediol-bis-(carbonic acid-benzoic acid anhydride) in preferred examples of the product is therefore from 99.5 to 30%, by weight, and especially from 85 to 60%, by weight.

The blowing agent mixture according to the invention is suitable for blowing thermoplastic resin melts, but particularly for foaming polymers which require to be blown at temperatures above 180° C. Thermoplasts of this type include, e.g. polycarbonates, polyesters, polyamides and mixtures of polyphenylene ethers and polystyrene.

Granulates of the thermoplast are mixed with the blowing agent mixture and heated to a temperature above the decomposition temperature of the blowing agent preparation and above the softening temperature of the thermoplast. The thermoplast melt is thereby foamed by the decomposition of the blowing agent preparation. The foaming temperature employed may be, for example, from 160° to 300° C.

The proportion of blowing agent mixture in the thermoplastic material which is required to be foamed may vary over a wide range and is suitably from 0.1 to 15%, more preferably from 0.5 to 5%, by weight, based on the finished mixture of thermoplastic granulate and blowing agent preparation.

The blowing agent preparation is preferably mixed into the dried resin granulate which is ready for use. The finished mixture may contain colourless or coloured unreinforced and/or reinforced thermoplast granulates as well as additives, such as colouring agents, stabilizers, fillers, glass fibres, flame retarding additives, as well as other blowing agents which split off carbon dioxide and/or nitrogen, e.g. azodicarbonamie, isophthalic acid-bis-carbonic acid ethyl ester anhydride), benzazimides and decomposition accelerators, such as zinc napthenates, zinc oxide, magnesium oxide, cobalt naphthenates and benzene sulphinates.

These mixtures of thermoplastic resins and blowing agent mixture according to the invention, which optionally contain other additives, may be shaped from the resin melt by the conventional processes of shaping hollow or solid bodies, e.g. injection moulding, extrusion casting or rotatonal moulding.

The temperature range within which the blowing agent preparation according to the invention undergoes decomposition may vary with the amount of finely divided silicon dioxide and other additives contained in the preparation and with the nature of the thermoplastic resin used. The decomposition range for the blowing agent preparation according to the invention is generally from 160° to 240° C. The decomposition velocity is preferably from 15 to 90 seconds for 100 ml of blowing agent gas measured at room temperature at normal pressure per gram of blowing agent preparation.

The polycarbonates which may be foamed in this way include, for example, the polycondensates which can be obtained by the reaction of aromatic dihydroxy compounds, in particular dihydroxydiarylalkanes, with phosgene or diesters of carbonic acid, but not only unsubstituted dihydroxydiarylalkanes are suitable for the preparation of these polycondensates, but also dihydroxydiarylalkanes in which the aryl groups carry methyl groups or halogen atoms in the ortho- and/or meta-position to the hydroxyl group. Branched polycarbonates are also suitable.

The polycarbonates which may be foamed have average molecular weights of, e.g. from 10,000 to 100,000 and more preferably from 20,000 40,000.

The following are examples of suitable aromatic dihydroxy compounds: hydroquinone, resorcinol, 4,4'-dihydroxydiphenyl, bis-(hydroxy-phenyl)-alkanes, such as $C_1-C_8$ alkylene or $C_2-C_8$ alkylidene bisphenols, bis-(hydroxypenyl)-cycloalkanes, such as $C_5-C_{15}$ cycloalkylidene bisphenols, bis-(hydroxyphenyl) sulphides, -ethers, -ketones, -sulphoxides or -sulphones, as well as $\alpha,\alpha'$-bis-(hydroxyphenyl)-diisopropylbenzene and the corresponding compounds which are alkylated or halogenated in the nucleus. Polycarbonates based on bis-(4-hydroxyphenyl) -propane-(2,2) (bisphenol A), bis-(4-hydroxy-3,5-dichlorophenyl -propane-(2,2)(tetrachlorobisphenol A), bis-(4-hydroxy-3,5-dibromophenyl) -propane-(2,2)(tetrabromobisphenol A), bis-(4-hydroxy-dimethyl-phenyl) -propane (2,2) (tetramethyl-bisphenol A), bis-(4hydroxyphenyl)-cyclohexane-(1,1) (bisphenol Z) and those based on trinuclear bisphenols, such as $\alpha,\alpha'$-bis-(4-hydroxyphenyl) -p-diisopropylbenzene, are preferred.

Other aromatic dihydroxy compounds which are suitable for the preparation of polycarbonates have been described in U.S. Pat. Nos. 3,028,365; 2,999,835; 3,148,172; 3,271,368; 2,970,137; 2,991,273; 3,271,367; 3,280.078; 3,014,891 and 2,999,846.

The polyamides which are to be foamed may be condensation products containing recurrent amide groups are constituents of the polymer chain. They can be prepared by polymerising a monoamino-monocarboxylic acid or internal lactam thereof, such as caprolactam, amino-undecanoic acid or aluric lactam, or by condensing a diamine, such as hexamethylene diamine, trimethylhexamethylene diamine or octamethylene diamine, with dicarboxylic acids, such as adipic acid, decanedicarboxylic acid, isophthalic acid or terephthalic acid.

Polyesters which are to be foamed may be, e.g. saturated linear polyesters of terephthalic acid with an intrinsic viscosity of from 0.5 to 1.5 dl/g in which the dicarboxylic acid component contains $\leq 90$ mol % of terephthalic acid and the glycol component $\leq 90$ mol % of glycols of the $C_2$ to $C_{10}$ series.

Mixtures of polyphenylene ethers and polystyrene which may be foamed are thermoplastic compounds consisting of a polyphenylene ether and a rubber-modified, impact resistant polystyrene which contains a finely divided elastomeric gel phase dispersed in a polystyrene matrix. The polyphenylene ether consists of recurrent units of the following structure:

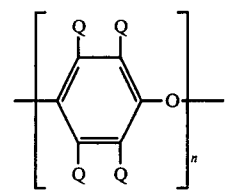

wherein the oxygen ether atoms of one unit is attached to the benzene ring of the adjacent unit; n represents 50; and each radical Q represents a monovalent substituent, such as hydrogen atoms, halogen atoms, hydrocarbon groups, halogenated hydrocarbon groups, alkoxy groups and halogenated alkoxy groups. The polystyrene matrix resins are derived from a monovinyl aromatic monomer, e.g. one represented by the following general formula:

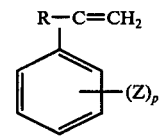

wherein R represents hydrogen, alkyl or halogen; Z represents hydrogen, halogen or alkyl; and $p = 0$ or an integer of from 1 to 5. The elastomeric gel phase consists of polybutadiene and/or a copolymer of butadiene and styrene or a mixture of polybutadiene and this copolymer.

Other substances suitable for the preparation of such mixtures have been described in U.S. Pat. No. 3,383,435 and in German Offenlegungsschrift Nos. 2,342,119; 2,255,930; 2,211,006; 2,211,005; 2,136,838; 2,119,301 and 2,000,118.

The nature of the invention will now be explained more fully with the aid of the following Examples.

BRIEF DESCRIPTION OF THE DRAWING

The FIGURE is a plot of gas evaluation measured in ml versus temperature in degrees Celsius for 1,4-butane diol-bis-(carbonic acid ester benzoic acid anhydride) and two blowing agent mixtures of the present invention.

EXAMPLE 1

The evolution of gas from the blowing agent as a function of the temperature was determined in a standard apparatus (flask, pneumatic tank). This apparatus does not give absolute values but only relative values. It is therefore suitable for comparison tests.

The following blowing agents were tested:
1. 2.00 g of 1,4-butanediol-bis-(carbonic acid ester-benzoic acid anhydride), 100%;
2. 1.48 g of 1,4-butanediol-bis-(carbonic acid ester-benzoic acid anhydride), 100%, + 0.52 g of silicon dioxide which has a surface of from 270 to 330 m²/g according to BET and a water content of 1.5%. This silicon dioxide is manufactured by Degussa under the trade name "Aerosil 300";
3. 2.000 g of 1,4-butanediol-bis-(carbonic acid ester-benzoic acid anhydride), 100% + 0.7 g of silicon dioxide (same quality as described under 2).

The graphs in FIG. 1 represent the liberation of gas as a function of the temperature for the three blowing agents indicated above. They show that the blowing agent preparation according to the invention has a lower decomposition temperature and higher gas yield than 1,4-butanediol-bis-(carbonic acid ester-benzoic acid anhydride). It is important to note that the decomposition curve of the blowing agent preparation according to the invention ascends in almost a straight line. This indicates that the mixture according to the invention tends to decompose more uniformly.

EXAMPLE 2 a. 20.0 kg of polycarbonate granulate obtained from bisphenol A with a relative viscosity of 1.287 (0.5% solution in methylene chloride), ("Makrolon 2800", Manufacturers Bayer AG) were carefully dried (14 hours at 105° C) and then thoroughly mixed with 540 g of the blowing agent No. 2 of Example 1 (2.7%, by weight, based on the mixture ready for use). This mixture was processed into foam plates in a commercial thermoplast foam injection moulding machine (TSG machine, e.g. Structomat manufactured by Seimag). Temperature profile: 250°/270°/290°/300° C. Plates: 80 cm × 40 cm × 10 mm thickness, $d=0.75$ g/cm$^3$. The plate shaped mould was completely filled with foam and the moulded plates showed no signs of discolouration. The plates had a uniform pore structure in transverse and longitudinal section. Test samples measuring 120 mm × 15 mm × 10 mm cut out of the plates were found to have an impact strength of about 35 KJ/m$^2$ determined according to DIN 53 453.

b. 20.0 kg of polycarbonate granulate of bisphenol A with a relative viscosity of 1.287 (0.5% solution in methylene chloride) ("Makrolon 2800," Manufacturers: Bayer AG) were carefully dried (14 hours, 105° C) and then thoroughly mixed with 500 g of 1,4-butanediol-bis-(carbonic acid ester-benzoic acid anhydride) (2.5%, by weight, based on the mixture ready for use). This mixture was processed as indicated in Example 2a. Temperature profile: 270°/290°/310°/300° C, plates 80 cm × 40 cm × 10 mm thickness, $d=0.75$ g/cm$^3$.

The plate mould was completely filled with foam and the plates themselves showed no signs of discoloration. In longitudinal section, the plates were clearly seen to have an uneven pore structure at the flow ends. Samples measuring 120 mm × 15 mm × 10 mm cut out of the centre of the plates had an impact strength of about 25 KJ/m$^2$ according to DIN 53 453.

EXAMPLE 3

20.0 kg of polyamide granulate produced by polycondensation of caprolactam ("Durethan BK 30 S", Manufacturers: Bayer AG) were carefully dried and then processed with 540 g of the substance according to the invention (2.7%, by weight, based on the finished mixture) in a TSG machine as indicated in Example 2 a). Temperature profile: 225°/240°/260°/260° C, plates: 80 cm × 40 cm × 10 mm thickness. The plate mould was completely filled with foam. The plates showed no signs of discoloration and had a finely porous, uniform foam structure in transverse and longitudinal section. Their density was $d=0.73$ g/cm$^3$.

EXAMPLE 4

20.0 kg of granulate of polybutylene terephthalate ("Pocan PBT", Manufacturers: Bayer AG) were carefully dried and then thoroughly mixed with 540 g (2.7%, by weight, based on the finished mixture) of the substance according to the invention and then processed on a TSG machine as described in Example 2a. Temperature profile: 225°/240°/260°/ 250° C, plates 80 cm × 40 cm × 10 mm thickness. The mould of the plate was completely filled with foam. The foam plates showed no signs of discoloration. They had a uniform, finely porous foam structure in longitudinal and transverse section. Their density was $d = 0.74$ g/cm$^3$.

EXAMPLE 5

20.0 kg of granulate of a thermoplastic compound produced from polyphenylene ether and impact resistant polystryene ("Noryl, FN 215", Manufacturers: General Electric) were carefully dried and then thoroughly mixed with 700 g of the substance according to the invention (3.5%, by weight, based on the finished mixture) and processed in a TSG machine as described in Example 2a. Temperature profile: 210°/230°/250°/250° C, plates: 80 cm × 40 cm × 10 mm thickness. The plate mould was completely filled with foam. The plates showed no signs of discoloration. They had a uniform fine porous foam structure in longitudinal and transverse section. Their density was $d = 0.72$ g/cm$^3$.

We claim:

1. Blowing agent mixture consisting of from 85 – 60%, by weight, of 1,4-butanediol bis-(carbonic acid ester-benzoic acid anhydride) and from 15 – 40%, by weight, of silicon dioxide.

2. Blowing agent mixture according to claim 1, characterised in that the siicon dioxide has a surface area according to B.E.T. of from 50 to 400 m$^2$/g.

3. Blowing agent mixture according to claim 2, characterised in that the water content of the silicon dioxide is less than 1.5% by weight.

* * * * *